United States Patent [19]
Butler et al.

[11] Patent Number: 5,654,592
[45] Date of Patent: Aug. 5, 1997

[54] POWER SUPPLY CONTROLLER

[75] Inventors: David Butler; Peter Lewis John Frost, both of Suffolk, England

[73] Assignee: British Telecommunications public company limited, London, England

[21] Appl. No.: 191,500

[22] Filed: Feb. 4, 1994

[30] Foreign Application Priority Data

Sep. 15, 1993 [EP] European Pat. Off. .............. 93307255

[51] Int. Cl.$^6$ ...................................................... H02J 1/00
[52] U.S. Cl. .................. 307/80; 307/18; 307/38; 307/125; 359/137; 359/121
[58] Field of Search ................... 307/11, 18, 23, 307/29, 85, 86, 87, 125, 116, 130, 38, 39, 80, 81, 131, 143, 31–37, 19, 112; 370/112; 359/125, 137, 171, 124, 115, 189; 200/1 R, 11 R, 11 TC

[56] References Cited

U.S. PATENT DOCUMENTS

| | | | |
|---|---|---|---|
| 4,451,773 | 5/1984 | Papathomas et al. | 307/48 |
| 5,214,527 | 5/1993 | Chang et al. | 359/189 |
| 5,262,680 | 11/1993 | Hu | 307/130 |

FOREIGN PATENT DOCUMENTS 04686631  1/1992  European Pat. Off. .

OTHER PUBLICATIONS

Fisher, "Powering Active Nodes in Active Loops", International Conference on Communications—Conference Record (CAT. No. 91CH2984–3), vol. 2, 23 Jun. 1991, Denver, CO, USA, pp. 929–935.

Weintrob, "Power Applications for Non-Central Office Applications in the United States—a Tutorial", INTELEC 91—Thriteenth International Telecommunications Energy Conference (91CH2970–2) 5 Nov. 1991, Kyoto, Japan, pp. 65–69.

Kuwata, "Power Supplies for Fiber Optic Subscriber Systems", INTELEC 91—Thirteenth International Telecommunications Energy Conference (91CH2970–2) 5 Nov. 1991, Kyoto, Japan, pp. 314–321.

*Primary Examiner*—David S. Martin
*Assistant Examiner*—Jonathan Kaplan
*Attorney, Agent, or Firm*—Nixon & Vanderhye P.C.

[57] ABSTRACT

The power supply unit (1) of an optical fibre telecommunications network distribution point is provided with a power supply controller. The power supply unit (1) is connected to a plurality of power supply lines in the premises of a plurality of customers. A controller (6) controls the supply of power from the power supply lines to the power supply unit of the distribution point.

7 Claims, 1 Drawing Sheet

POWER SUPPLY CONTROLLER

FIELD OF THE INVENTION

This invention relates to a power supply controller for use in an optical fibre telecommunications network.

BACKGROUND OF THE INVENTION

Throughout this specification, the term "optical" is intended to refer to that part of the electromagnetic spectrum which is generally known as the visible region, together with those parts of the infra red and ultra violet regions which are capable of being transmitted by dielectric waveguides such as optical fibres.

An optical fibre telecommunications network is used to distribute information (optical signals) from one or more transmitting stations to one or more receiving stations. For telecommunications purposes, a passive optical network (PON), such as TPON (telecommunications over a passive optical network), is advantageous in that it permits telecommunications over a network using a single transmitter (a laser located at exchange connected to the network). The main advantage of TPON is that it enables the sharing of optical network fibres, and the opto-electronic equipment that serves them. TPON involves the use of optical splitter to pass optical signals from the exchange laser to receivers (typically telephones) at the customers' premises. A preferred split level is a 32-way split, accomplished by a four-way split at the cabinet level, and by eight-way splits at the four distribution points (DPs) fed by the cabinet.

In a preferred form of TPON, known as street TPON, the final drop to the customers is by copper pairs, and the fibre terminates at the DPs. In this case, each DP is provided with opto-electronic conversion/switching equipment, and this equipment needs to be powered electrically.

One way of powering such equipment would be to provide a mains electricity feed. The disadvantage of this is the expense involved in providing the transformer and control equipment necessary to power the opto-electronic conversion/switching equipment. Moreover, as DPs are commonly sited at the tops of poles, this transformer and control equipment would have to be sited in footway boxes, and this leads to high installation costs. Similarly, the provision of batteries to power the opto-electronic conversion/switching equipment would lead to high installation costs, as these too would need to be sited in the ground.

SUMMARY OF THE INVENTION

The aim of the invention is to provide a way of powering this equipment.

The present invention provides a power supply controller for the power supply unit of an optical fibre telecommunications network distribution point, the power supply controller comprising a switch, a plurality of power supply lines interconnecting the switch and power supply units in the premises of a plurality of customers, and control means for controlling the supply of power from the power supply lines to the power supply unit of the distribution point.

The controller may further comprise line monitoring means for monitoring the voltage on each of the power supply lines, the control means being such as to prevent power being supplied to the power supply unit of the distribution point from a given power supply line if the voltage on that supply line does not lie within a predetermined voltage range.

Advantageously, the control means controls the line monitoring means so as to monitor the power supply lines cyclically in a predetermined order, and so that, for each monitoring cycle, the switch is controlled to switch power from those power supply lines whose voltage lies within said predetermined range to the power supply unit of the distribution point one after another. Preferably a microprocessor constitutes the control means.

Conveniently, the line monitoring means is constituted by a respective line monitoring integrated circuit associated with each of the power supply lines.

The controller may further comprise interface means between the power supply lines and the switch, the interface means including a respective bridge rectifier associated with each of the power supply lines. Preferably, the interface means also constitutes an interface between the power supply lines and the line monitoring means.

BRIEF DESCRIPTION OF THE DRAWING

A power supply controller for controlling the power supply to the opto-electronic conversion/switching equipment within a street TPON DP 10, and constructed in accordance with the invention, will now be described, by way of example, with reference to the accompanying drawing, the single figure of which is a block circuit diagram of the controller.

Referring to the drawing, a power supply controller for a street TPON DP includes a power supply unit (PSU) 1 for powering the TPON multiplexer (not shown) of the DP. The PSU 1 is rated to output 24 volts dc. The DP PSU 1 is itself powered, via a switch 2 and a customer interface card 3, by PSUs (not shown) in the eight customer premises associated with the DP. Each customer PSU is connected to the interface card 3 via a respective supply line 4, and the interface card has corresponding output lines 5 which lead to respective terminals 2a of the switch 2.

Figure 1:
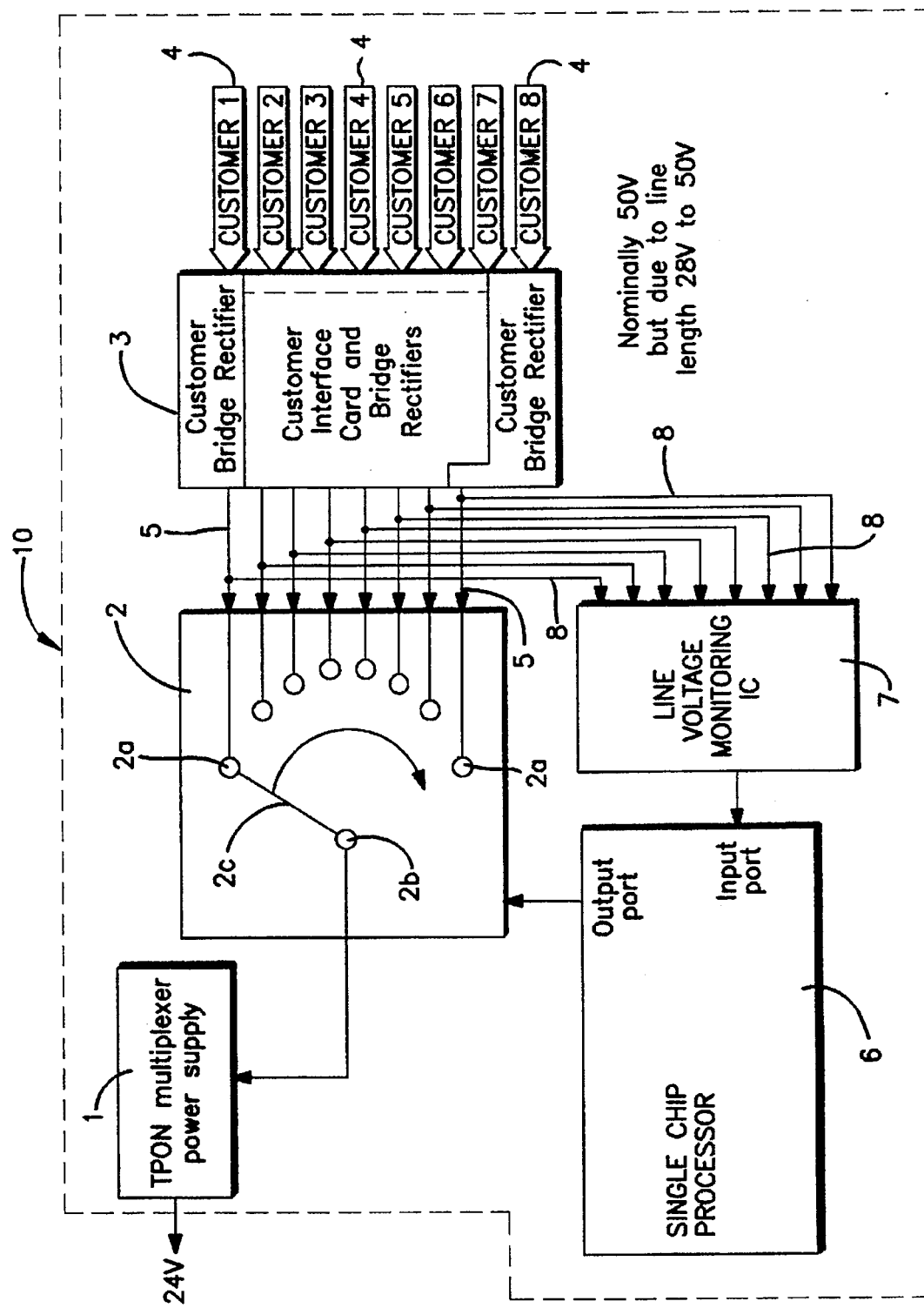

The customer PSUs are nominally rated at 50 volts, but the lengths of the lines 4 leading to the customer interface card 3 may reduce the voltages input to the DP PSU 1 to about 28 volts. Moreover, as the supply lines 4 are likely to be of different lengths, the voltages on the supply lines will also tend to be different. The customer interface card 3 includes bridge rectifiers, one per supply line 4, to prevent one line feeding any of the other lines, and also to prevent a power failure on a given line affecting any of the other lines. The switch 2 also has a terminal 2b which is connected to the DP PSU 1, and a contact 2c for connecting the terminal 2b optionally to any one of the terminals 2a. The switch 2 is controlled by a processor 6 and a voltage monitoring circuit 7. The processor 6 is a single chip microprocessor such as a 1468052E (an 8-bit CMOS microprocessor containing a central processing unit, 112 bytes RAM, 16 input/output lines, an on-chip counter, and 8K of addressing space). The circuit 7 has a respective voltage monitoring integrated circuit (not shown) connected to each of the output lines 5 via a respective line 8.

In use, the voltage monitoring circuit 7 checks the voltage on the supply lines 4 for suitability. A suitable voltage is one which is within predetermined voltage limits, and in particular does not fall below 27.5 volts. The processor 6 controls the switch 2 to select each suitable supply line 4 in turn, the check for suitability occurring just prior to the actual selection. If a given supply line 4 is suitable, it is used to power the DP PSU 1 by connecting the terminal 2b of the switch 2 to the appropriate customer terminal 2a using the contact 2c. If a given supply line 4 is unsuitable, the processor 6 reconfigures the switch 2 to avoid that supply line. Each supply line 4 is, however, checked in turn, so that, as soon as a previously-unsuitable supply line is again suitable, it will be selected next time it is checked. If the arrangement is such that each supply line 4 is selected for a period of one second each time its voltage is suitable, the DP PSU 1 has a 24 volt dc stable output, for all combinations of customer supply line circumstances, even when only one customer supply is suitable.

An important feature of the power supply controller described above is that the voltage checks and switch reconfigurations are carried out in real time. In this way, power can always be guaranteed to the DP PSU 1, even when only a single customer's supply line 4 is suitable. Should all customer supply lines 4 be unsuitable, or fail due to a power cut, an alarm signal is generated at the instigation of the processor 6, and this could be used to switch in battery backup power supplies (not shown) for the customer PSUs.

The processor 6 also logs the duration of each time each supply line 4 in accessed. This information is downloaded to the exchange at regular intervals (say every night), and forms the basis of a rebate system for the customers. In this way, customers can be recompensed for actual electricity usage, rather than on the basis of a fixed rate of anticipated use.

It will be apparent that the power supply controller described above could be modified. For example, the simple relay switches 2a, 2b, 2c could be replaced by semiconductor switches. Also, the processor 6 could by programmed to monitor each customer's supply line 4 in order for it to decide what switching sequence to implement. The processor 6 would then select a switching sequence that will sample valid lines and not sample the rest. The switching sequence is re-calculated upon every loop, so again real time operation results. Thus, there is no appreciable delay between the monitoring process and the switching sequence, as the controller dynamically tracks the status of each supply line 4.

We claim:

1. A power supply controller for a power supply unit within an optical fibre telecommunications network distribution point, the power supply controller comprising a switch connected to the power supply unit, a plurality of power supply lines interconnecting the switch and a plurality of customer power supply units at a plurality of respective customer locations, and control means for controlling the switching of the supply of power from each of the power supply lines to the power supply unit of the distribution point.

2. A controller as claimed in claim 1, further comprising line voltage monitoring means for monitoring the voltage on each of the power supply lines, the control means preventing power being supplied to the power supply unit of the distribution point from a given power supply line if the voltage on that supply line does not lie within a predetermined voltage range.

3. A controller as claimed in claim 2, wherein the control means controls the line voltage monitoring means to monitor the power supply lines cyclically in a predetermined order, and so that, for each monitoring cycle, the switch is controlled to switch power from those power supply lines whose voltage lies within said predetermined range to the power supply unit of the distribution point one after another.

4. A controller as claimed in claim 1, wherein a microprocessor constitutes the control means.

5. A controller as claimed in claim 2 wherein the line voltage monitoring means includes a line voltage monitoring integrated circuit connected to each of the power supply lines.

6. A controller as claimed in claim 2, further comprising interface means between the power supply lines and the switch, the interface means including a respective bridge rectifier associated with each of the power supply lines.

7. A controller as claimed in claim 6, wherein the interface means is also connected as an interface between the power supply lines and the line monitoring means.

* * * * *